Patented Aug. 9, 1932

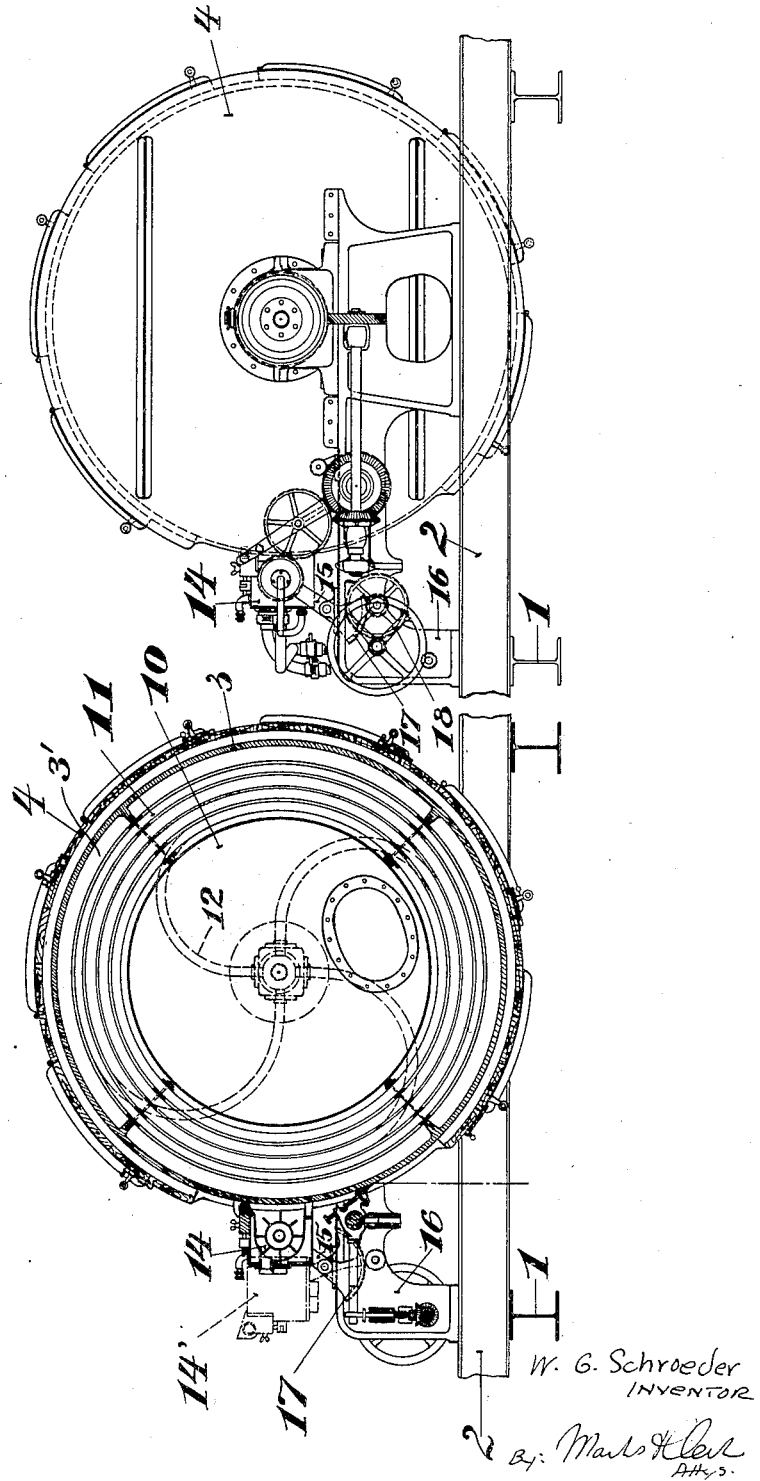

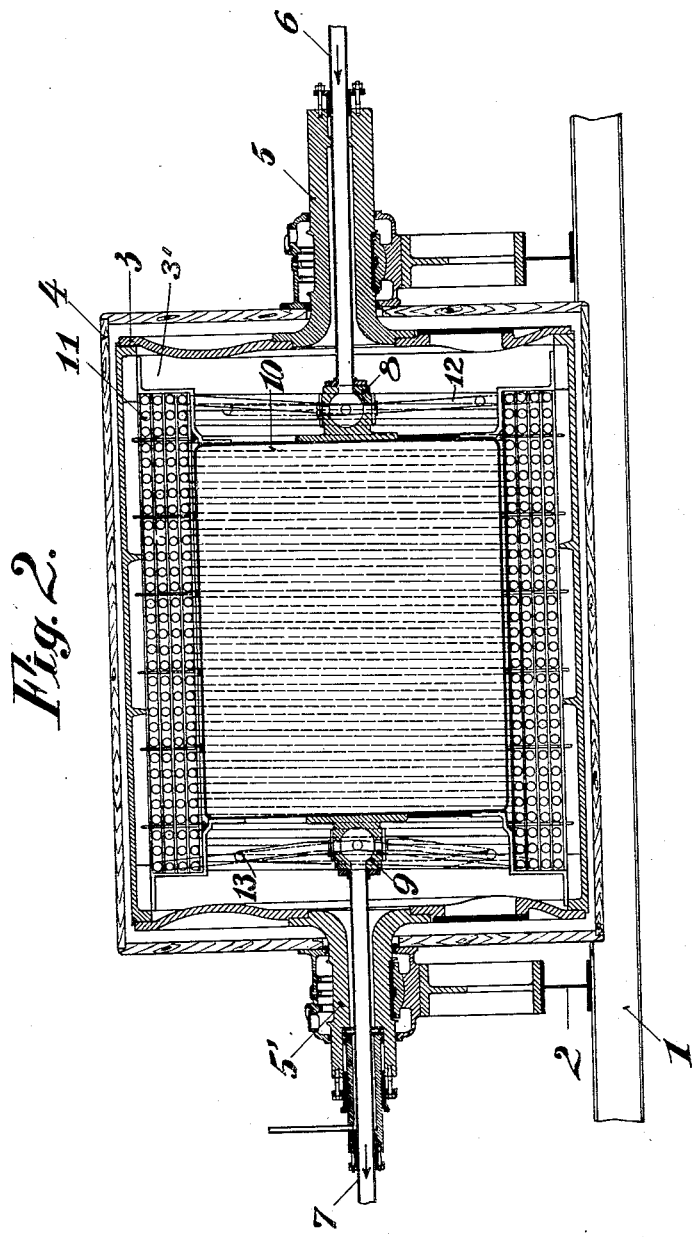

1,870,531

UNITED STATES PATENT OFFICE

WILHELM GOTTHILF SCHROEDER, OF LUBECK, GERMANY

REFRIGERATING PROCESS AND APPARATUS FOR COOLING FAT EMULSIONS SUCH AS MARGARINE AND THE LIKE

Application filed August 20, 1929, Serial No. 387,166, and in Germany February 4, 1926.

For cooling fat emulsions in the margarine industry for example cooling drums are used in which the material to be cooled is applied in a thin layer on the surface of the drum casing and is cooled down. In order to produce a rapid cooling of the emulsion layer, brine cooled down to −15 to −20° was pumped through the interior space of such a cooling drum so that the emulsion applied to the surface of the drum casing solidified as rapidly as possible; the solidified emulsion was then scraped off by means of sharp knives applied to the drum, it fell onto a conveying device and was worked up in a kneading machine to a finished butter-like product.

In order to produce a desired high output with such a cooling drum, it was heretofore necessary to pump a large quantity of strongly cooled brine (about 20 to 30 litres per 1 kg. of margarine) through the drum casing. The strong cooling of such a large amount of brine, however, necessitates with large scale production a somewhat large plant of refrigerating machines, a large amount of space and considerable driving power. Hitherto the brine was preliminarily cooled in a large tank, until it attained the low degree of cooling and then was pumped by means of a pump through the cooling drum and led back again into the brine tank. In this manner much coldness was withdrawn from the brine, which had to be replaced again by the plant of refrigerating machines.

In order to remedy these disadvantages the applicant has proposed to construct the evaporator of the refrigerating machine within the revolving casing of the cooling drum. The remaining hollow space in the drum is filled with brine. The subject of the present invention is a constructional form of such an evaporator which possesses special advantages.

As is well known, the evaporator of the usual refrigerating machines must be provided with a stirring mechanism in order always to bring new parts of the brine into contact with the heat-exchange surfaces. In the present constructional form of the new arrangement the stirring mechanism may be dispensed with by rigidly connecting the coil of pipe to the drum so that it may rotate together with this latter. The coil of pipe representing the evaporator to be built in the drum is then preferably coiled up in a direction contrary to the direction of motion of the drum. The advantage is hereby attained that any condensate which appears during the rotation of the drum is gradually led away with the vapours of the cooling agent out of the coil. According to the invention, the hollow drum shafts serve as supply and withdrawal conduits for the coil.

Further, according to the invention, for the exterior cooling of the revolving drum, a contact cooling is to be employed, the coldness emanating from the drum surface being stored up in the space between the casing and the drum and so serving as a cooling agent reacting on the surface of the emulsion, whereby the direct action of the outer air is prevented.

One constructional form of the subject of the invention is shown, by way of example, in the accompanying drawings.

Figure 1 shows an end view of the complete arrangement,

Figure 2 shows a sectional elevation through the drum axis, and

Figure 3 shows a transverse section through the apparatus.

In the constructional form shown, the whole apparatus rests upon longitudinal and transverse supports 1, 2. The main part of the apparatus consists of the revolving cooling drum 3. This drum is jacketed to a large extent of its circumference by an insulating casing 4, such that between the revolving drum and the stationary casing a hollow cylindrical space remains free.

The following arrangement serves for cooling the interior of the drum. The shaft portions 5, 5′, by means of which the drum 3 is rotatably mounted on either side, are constructed hollow and serve on the one side for the accommodation of the supply pipe 6, and on the other side for the recommendation of the discharge pipe 7. The supply pipe 6 and the withdrawal pipe 7 each terminate in the drum with hollow heads 8 and 9, which are attached to a hollow member 10 mounted in the interior of the drum, about which hollow member a tube coil 11 is placed. This coil, as in the evaporators of refrigerating machines otherwise usual, may consist of several concentrically coiled tube lengths. In the constructional example shown, four concentric tube lengths are provided, which are preferably coiled in a direction contrary to the direction of motion of the drum and are each connected with the supply head 8 and the discharge head 9 by a spoke-like distributing tube 12, or collecting tube 13.

In order to use the apparatus the annular-shaped hollow space 3' between the drum casing 3 and the hollow member 10 is filled with brine. The coil 11 is, by means of the supply and discharge pipes 6 and 7, inserted in the circuit of a refrigerating machine of the usual kind in such a way that the tube-coil 11 appears in place of the usual generator or evaporator. If the refrigerating machine is set in motion and, at the same time, the drum is set rotating, the cooling agent expands in the coil 11 and cools the brine surrounding this coil. A brisk heat exchange is here ensured by the rotation of the drum. Any portions of the cooling agent (e. g. ammonia or the like) which may condense are gradually to be forwarded to the discharge pipe 7, finally to stream out with the vapours there, by this, that the coil of tube is rotated in a direction contrary to that in which it is coiled up. As already indicated, the drum casing does not wholly surround the drum, but allows it to come into view at one place, where the applying device 14 is arranged, which latter is so adjusted that it can apply to the drum a layer of emulsion which is as thin as possible. For example, I employ herefor the device described in my Patent No. 1,679,685.

In the constructional example shown the container of the applying device 14 is supported in a swinging manner on a supporting frame 16 by means of arms 15 and, by means of a swinging arrangement 17, 18, may be swung into the position 14' shown in dotted lines in Fig. 3 for cleaning purposes.

What I claim is:

1. An apparatus for cooling fat emulsions comprising a jacket member, a drum provided with hub elements revolubly mounted in said member, a cylindrical member rigidly secured within said drum so as to form a space between them adapted to be constantly and completely filled with brine, a series of concentrically coiled tube lengths for a cooling agent mounted one within the other in said space and secured to said drum, said tube lengths being coiled to produce a flow of said cooling agent oppositely to the direction of rotation of said drum, supply and drain pipes in the respective hub elements terminating each with a hollow central head on the cylindrical member and tubular spokes on said head for each of said coiled tube lengths.

2. An apparatus for cooling fat emulsions comprising a jacket member, a drum provided with hub elements revolubly mounted in said member, a cylindrical member rigidly secured within said drum so as to form a space between them adapted to be constantly and completely filled with brine, a series of concentrically coiled tube lengths for a cooling agent mounted one within the other in said space and secured to said drum, said tube lengths being coiled in a direction to cause said cooling agent to flow oppositely to the direction of rotation of said drum, supply and drain pipes in the respective hub elements terminating each with a hollow central head on the cylindrical member and tubular spokes on said head for each of said coiled tube lengths.

3. An apparatus for cooling fat emulsions comprising a jacket member, a drum provided with hub elements revolubly mounted in said member, a cylindrical member rigidly secured within said drum so as to form a space between them, a series of concentrically coiled tube lengths for a cooling agent mounted one within the other in said space and secured to said drum, said tube lengths being coiled in a direction to cause said cooling agent to flow oppositely to the direction of rotation of said drum, supply and drain pipes in the respective hub elements terminating each with a hollow central head on the cylindrical member and tubular spokes on said head for each of said coiled tube lengths, said coiled tube lengths with their supply and drain pipes being inserted in the circuit of a refrigerating machine, and said space being adapted to be filled with brine.

In testimony whereof I have signed my name to this specification.

WILHELM GOTTHILF SCHROEDER.